United States Patent
Matsuo et al.

(10) Patent No.: US 7,864,733 B2
(45) Date of Patent: Jan. 4, 2011

(54) MOBILE STATION DEVICE FOR MULTICARRIER TRANSMISSION, BASE STATION DEVICE, AND CELL SEARCH METHOD

(75) Inventors: Hidenori Matsuo, Kanagawa (JP); Akihiko Nishio, Kanagawa (JP)

(73) Assignee: Panasonic Corporation, Osaka (JP)

( * ) Notice: Subject to any disclaimer, the term of this patent is extended or adjusted under 35 U.S.C. 154(b) by 824 days.

(21) Appl. No.: 11/632,299

(22) PCT Filed: Jul. 4, 2005

(86) PCT No.: PCT/JP2005/012355

§ 371 (c)(1),
(2), (4) Date: Jan. 12, 2007

(87) PCT Pub. No.: WO2006/008953

PCT Pub. Date: Jan. 26, 2006

(65) Prior Publication Data

US 2008/0025260 A1    Jan. 31, 2008

(30) Foreign Application Priority Data

Jul. 16, 2004  (JP) .............................. 2004-210661

(51) Int. Cl.
H04W 4/00  (2009.01)
(52) U.S. Cl. .................... 370/331; 370/432; 455/436
(58) Field of Classification Search .................. 370/208, 370/331, 310, 312, 315, 432; 455/436
See application file for complete search history.

(56) References Cited

U.S. PATENT DOCUMENTS 6,532,223 B1    3/2003    Sakoda
(Continued)

FOREIGN PATENT DOCUMENTS

JP    11-113044    4/1999
(Continued)

OTHER PUBLICATIONS

PCT International Search Report dated August 23, 2005.
(Continued)

*Primary Examiner*—Ricky Ngo
*Assistant Examiner*—Gary Mui
(74) *Attorney, Agent, or Firm*—Dickinson Wright PLLC

(57) ABSTRACT

A mobile station device which can correctly search for another cell quickly in a communication system using the OFCDM method. A blank subcarrier correlation calculating section (502) calculates the correlation between the blank subcarriers of the CPICH symbols adjacent to the cell signal of this mobile station device. A correlation-between-adjacent-symbols calculating section (503) calculates correlation between adjacent symbols in the frequency direction. A correlation value comparing section (505) compares the correlation values inputted from the correlation-between-adjacent-symbols calculating section (503) and detects the boundary between adjacent symbols having the maximum correlation value as a frame timing of the another cell. If the correlation value of the blank subcarrier correlation calculating section (502) is below a predetermined threshold, the correlation value comparing section (505) detects the frame timing having the maximum correlation value other than the frame timing of this cell as the frame timing of the another cell. If the correlation value is the threshold value or more, the correlation value comparing section (505) detects the frame timing of this cell as the frame timing of the another cell.

11 Claims, 15 Drawing Sheets

U.S. PATENT DOCUMENTS

| | | | |
|---|---|---|---|
| 6,556,585 B1* | 4/2003 | Moulsley | 370/465 |
| 7,376,424 B2* | 5/2008 | Kim et al. | 455/436 |
| 2002/0041579 A1 | 4/2002 | Tanno et al. | |
| 2003/0045299 A1* | 3/2003 | New | 455/455 |
| 2003/0103445 A1* | 6/2003 | Steer et al. | 370/208 |
| 2004/0071078 A1 | 4/2004 | Sudo | |
| 2004/0085946 A1 | 5/2004 | Morita et al. | |
| 2004/0146017 A1 | 7/2004 | Aoyama | |
| 2004/0233838 A1 | 11/2004 | Sudo et al. | |

FOREIGN PATENT DOCUMENTS

| | | |
|---|---|---|
| JP | 2002-94415 | 3/2002 |
| JP | 2003-179522 | 6/2003 |
| JP | 2003-259413 | 9/2003 |
| JP | 2003-304215 | 10/2003 |
| JP | 2003304220 | 10/2003 |
| JP | 2005-094672 | 4/2007 |

OTHER PUBLICATIONS

Japanese Office Action dated Sep. 24, 2009.

International Search Report dated Aug. 23, 2005.

M. Tanno, et. al., "Cell Search Time Performance of Three-Step Fast Cell Search Algorithm Employing Common Pilot Channel for Forward Link Broadband OFCDM Wireless Access," Technical Report of IEICE, RCS2002-135, Jul. 2002, pp. 99-104.

* cited by examiner

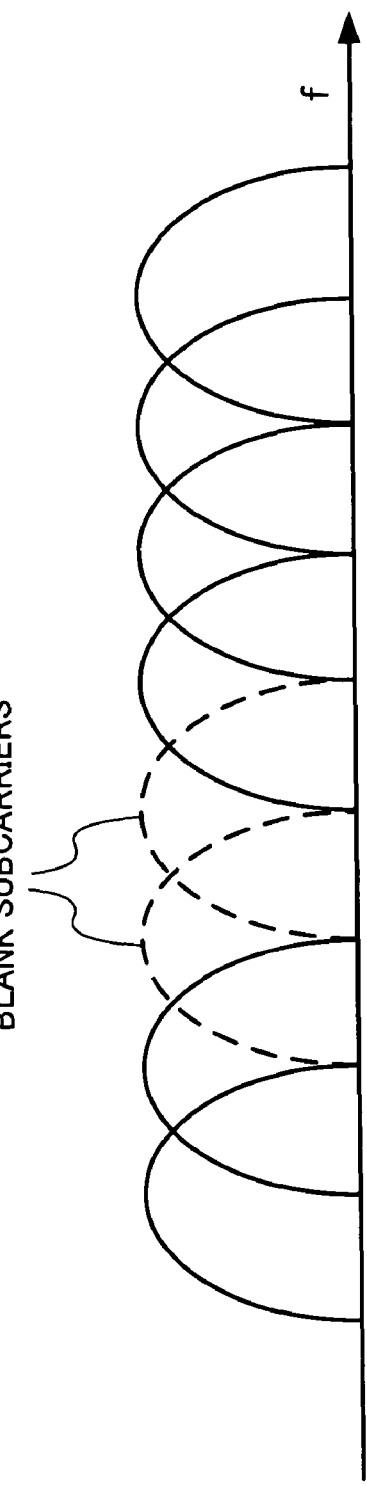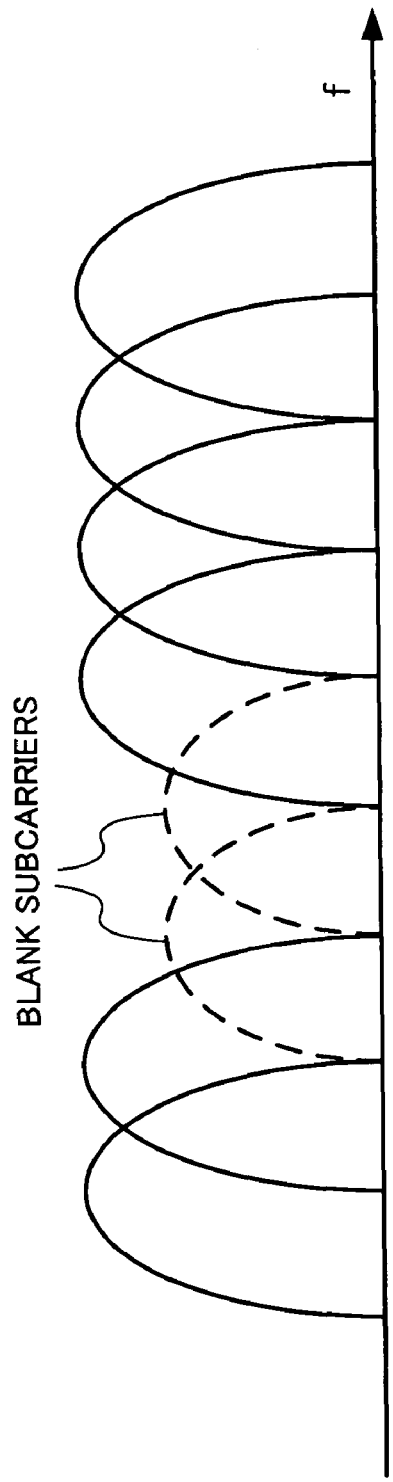

MOBILE STATION DEVICE FOR MULTICARRIER TRANSMISSION, BASE STATION DEVICE, AND CELL SEARCH METHOD

TECHNICAL FIELD

The present invention relates to a mobile station apparatus, base station apparatus and cell search method for multicarrier transmission.

BACKGROUND ART

The W-CDMA and the OFCDM (Orthogonal Frequency and Code Division Multiplexing) scheme which is promising as a mobile communication technology in the fourth generation propose a three-step cell search method for reducing the time for cell search (for example, refer to Non-Patent Document 1). A wireless communication system of the OFCDM scheme using the three-step cell search method will be described below.

FIG. 1 shows an example of a conventional wireless communication system. In FIG. 1, mobile station 11 communicates with one of base station 12, base station 13 and base station 14. Base station 12 communicates with mobile stations in the area of cell 22. Similarly, base station 13 communicates with mobile stations in the area of cell 23, and base station 14 communicates with mobile stations in the area of cell 24.

In FIG. 1, when mobile station 11 whose location is registered in base station 12 moves and performs handover from cell 22 (own cell) to cell 23 or cell 24 (another cell), mobile station 11 reports a scrambling code that is an identification code specific to that cell, the frame timing of that cell, and other additional information, regarding another cell, to base station 12. This is referred as cell search for another cell. Here, another cell means a area where the mobile station can communicate with a base station apparatus to which the mobile station does not belong.

When cell search for another cell is performed in the OFCDM scheme, in the first step, the mobile station detects an FFT timing using correlation characteristics (GI correlation) between guard intervals (GI) and a valid symbol segment of a received signal, and obtains a symbol timing candidate.

After the FFT timing is detected, the mobile station needs to know the head of the frame in order to decode data. When CPICHs (Common Pilot Channel) are time-multiplexed before and after the frame as shown in FIG. 2, the mobile station can detect frame timings (frame boundaries) by learning the positions of adjacent CPICHs. Therefore, in the second step, the mobile station performs correlation calculation between adjacent symbols in the frequency axis direction based on the detected symbol timing candidate, and detects a frame timing based on the scale of the correlation value.

Next, in the third step, the mobile station obtains correlations between the CPICHs detected in the second step and all candidates for the scrambling code, and identifies the scrambling code based on the scale of the correlation value, that is, specifies the cell.

Next, the conventional three-step cell search will be described in detail. FIG. 3 is a flowchart of the conventional three-step cell search.

In FIG. 3, in step (hereinafter, "ST") 31, FFT timing detection is performed, which is the first step of the cell search, and a symbol timing is detected.

Processing from ST33 to ST38 is performed on a plurality of FFT timing candidates k detected in ST31, from the symbol timing of k=0 (ST32). Further, processing from ST34 to ST36 is performed for each symbol, from i=0 (ST33).

In ST34, based on the symbol timing detected in ST31, correlation calculation is performed between adjacent symbols in the frequency axis direction. Then, it is confirmed whether or not correlation processing has been finished for all symbols in ST35. If correlation processing has been finished for all symbols, the flow proceeds to ST38, and, if not finished, i=i+1 is set in ST36, the flow proceeds to the next symbol, and correlation calculation between next adjacent symbols is performed again in ST34.

In ST38, it is confirmed whether or not correlation processing has been finished for all FFT timing candidates detected in ST32. If finished, the second step is regarded as being finished, the flow proceeds to ST39, and the third step processing is performed. If not finished, the second step continues, k=k+1 is set in ST37, the flow proceeds to the next FFT timing candidate, and the second step processing is performed again from ST33.

In ST39, it is determined whether or not the correlation values obtained through correlation calculation performed in ST34 are equal to or larger than a predetermined threshold. Then, the boundaries between adjacent symbols corresponding to the correlation values that are equal to or larger than the predetermined. threshold are used as frame timing candidates, and the frame timing candidates are rearranged in descending order of the correlation values.

In ST40, based on the frame timing candidates rearranged in ST39, correlation calculation is performed between all scrambling codes other than the scrambling code of the own cell and a received signal. Then, in ST41, it is determined whether the largest correlation value among the correlation values obtained in this correlation calculation is equal to or larger than a predetermined threshold. If the largest correlation value is less than the threshold, j=j+1 is set in ST42, and the correlation calculation of ST40 is performed again for the next frame timing candidate. On the other hand, if the largest correlation value is equal to or larger than the threshold, the scrambling code with this largest correlation value is identified as a scrambling code of another cell in ST43, and cell search is finished.

Non-Patent Document 1: Motohiro Tanno, Hiroyuki Atarashi, Kenichi Higuchi, and Mamoru Sawahashi, "Cell Search Time Performance of Three-Step Fast Cell Search Algorithm Employing Common Pilot Channel for Forward Link Broadband OFCDM Wireless Access", Technical report of The Institute of Electronics, Information and Communication Engineers, NS2002-107, RCS2002-135, pages 99 to 104

DISCLOSURE OF INVENTION

Problems to be Solved by the Invention

However, in the above-described three-step cell search, cell search for another cell is performed using signals including a signal from the own cell. Therefore, in the second step of cell search for another cell, it is not possible to determine whether the frame timing of the own cell and the frame timing of another cell are the same. Therefore, when the frame timing of the own cell and the frame timing of another cell are the same, as shown in FIG. 4, the frame timing of the own cell can be used as a frame timing of another cell. However, when the frame timing of the own cell and the frame timing of another cell are different as shown in FIG. 5, the frame timing of the own cell is detected in error as the frame timing of another cell. That is, cell search is not performed using the signal of only another cell, and therefore the own cell may be detected in error as another cell, and useless cell search processing may occur.

It is therefore an object of the present invention to provide a mobile station apparatus, base station apparatus and cell search method capable of performing cell search for another cell at high speed.

Means for Solving the Problem

With the present invention, when the mobile station starts a handover, the base station apparatus in the own cell does not transmit part of a plurality of subcarriers forming CPICH which is a pilot symbol, so that the mobile station is able to detect only signals transmitted from the base station in another cell at the subcarriers that are not transmitted. By this means, it is possible to determine whether the frame timing of the own cell and the frame timing of another cell are the same. Therefore, when the frame timing of another cell and the frame timing of the own cell are the same as shown in FIG. 6, the mobile station performs cell search processing at the frame timing of the own cell (that is, the frame timing of another cell). When the frame timing of another cell and the frame timing of the own cell are different as shown in FIG. 7, the mobile station does not perform cell search processing at the frame timing of the own cell. By this means, it is possible to omit useless processing compared to the conventional method of cell search for another cell.

Advantageous Effect of the Invention

According to the present invention, it is possible to accurately perform cell search for another cell at high speed in a communication system using the OFCDM scheme.

BRIEF DESCRIPTION OF DRAWINGS

FIG. 9A is a power control diagram of a pilot signal (before power control) according to one embodiment of the present invention;

FIG. 9B is a power control diagram of a pilot signal (after power control) according to one embodiment of the present invention;

BEST MODE FOR CARRYING OUT THE INVENTION

Embodiments of the present invention will be described in detail below with reference to the accompanying drawings.

Figure 1:
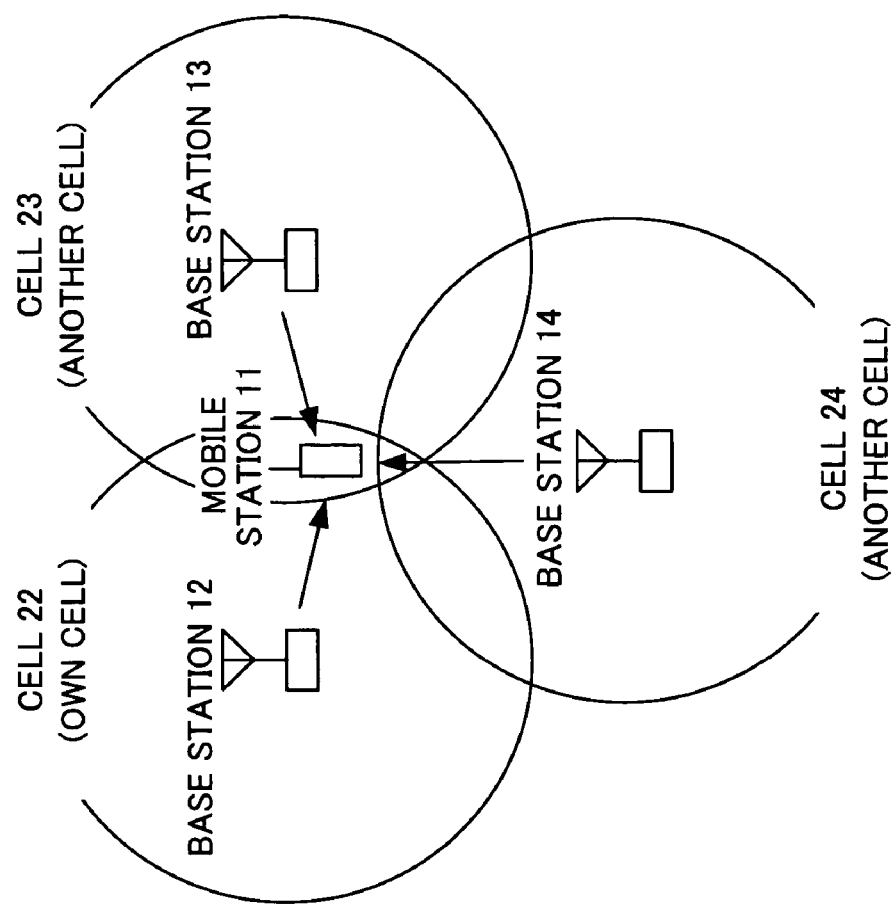
FIG. 1 shows an example of the conventional wireless communication system.
Figure 2:
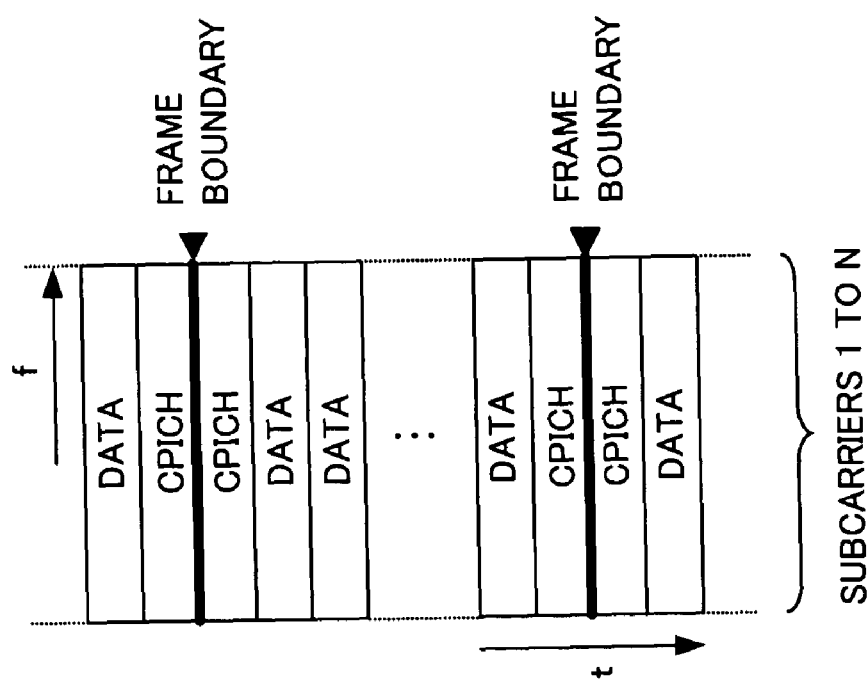
FIG. 2 shows the conventional frame format.
Figure 3:
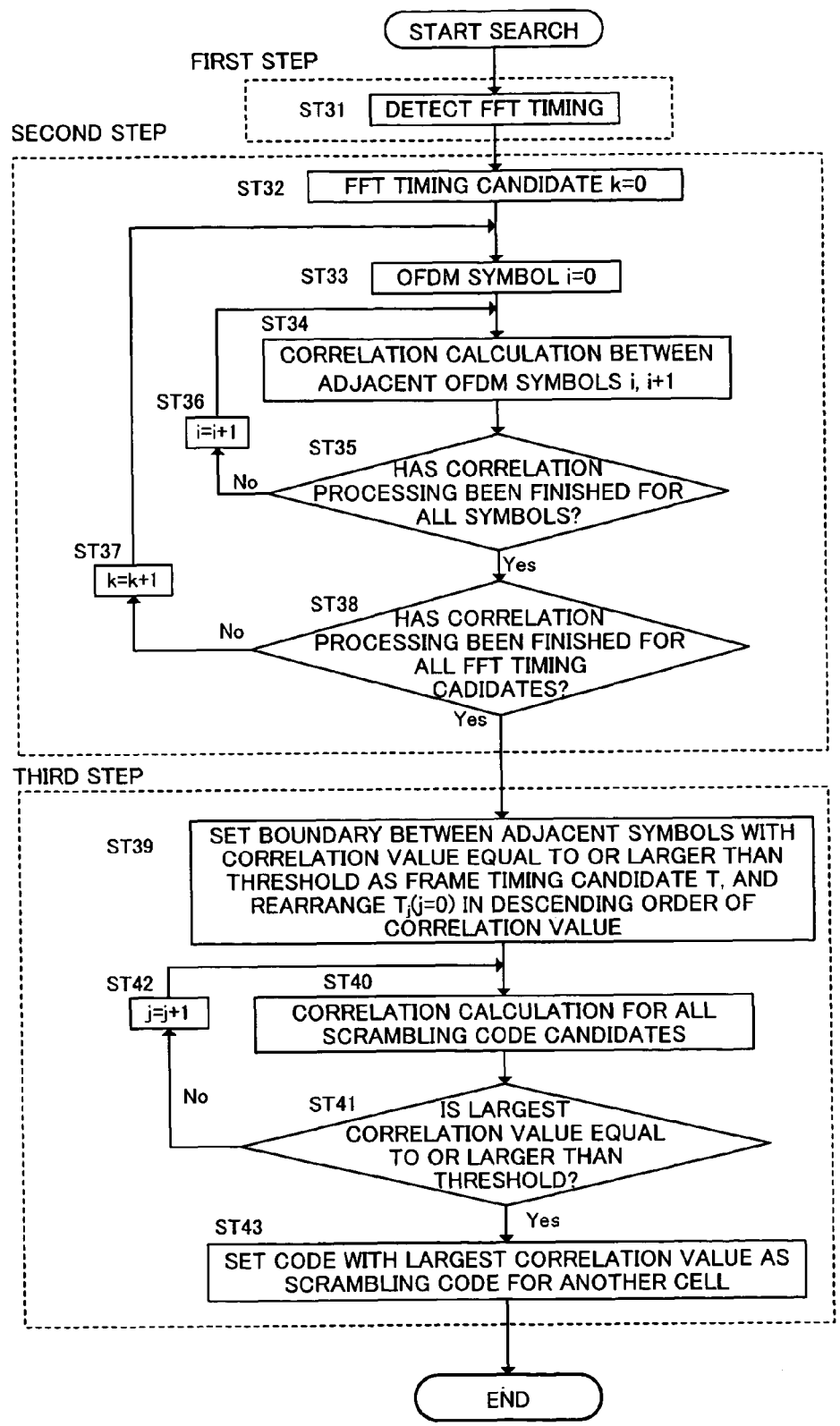
FIG. 3 is a flowchart of the conventional three-step cell search.
Figure 4:
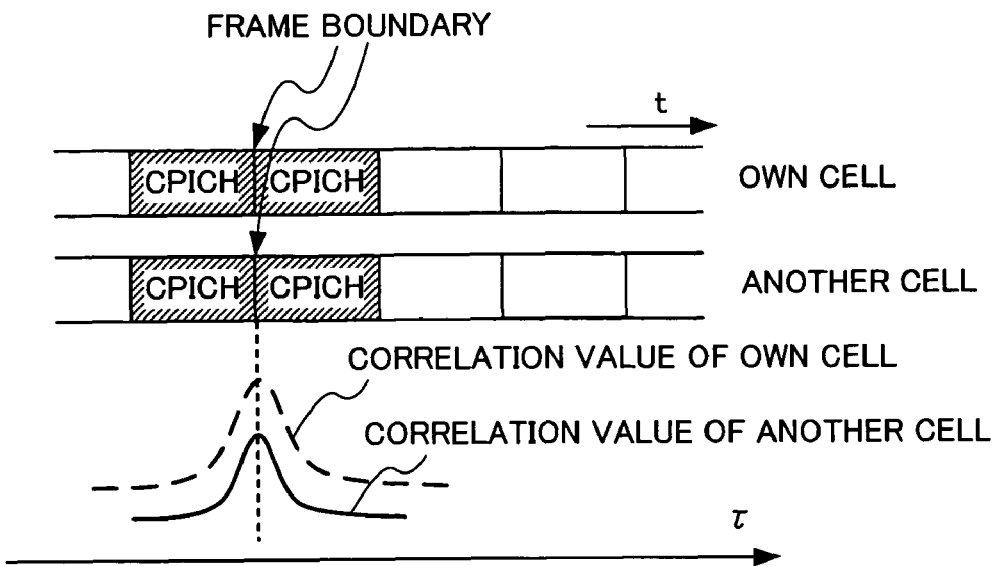
FIG. 4 illustrates the conventional frame timing detection (when the frame timing of another cell and the frame timing of the own cell are the same)
Figure 5:
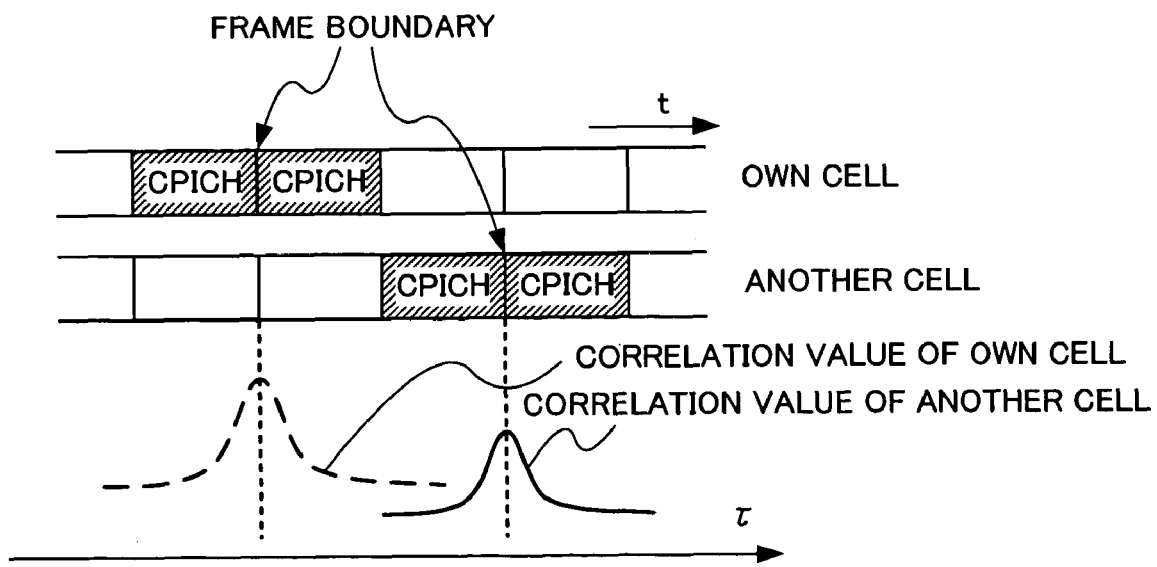
FIG. 5 illustrates the conventional frame timing detection (when the frame timing of another cell and the frame timing of the own cell are different)
Figure 6:
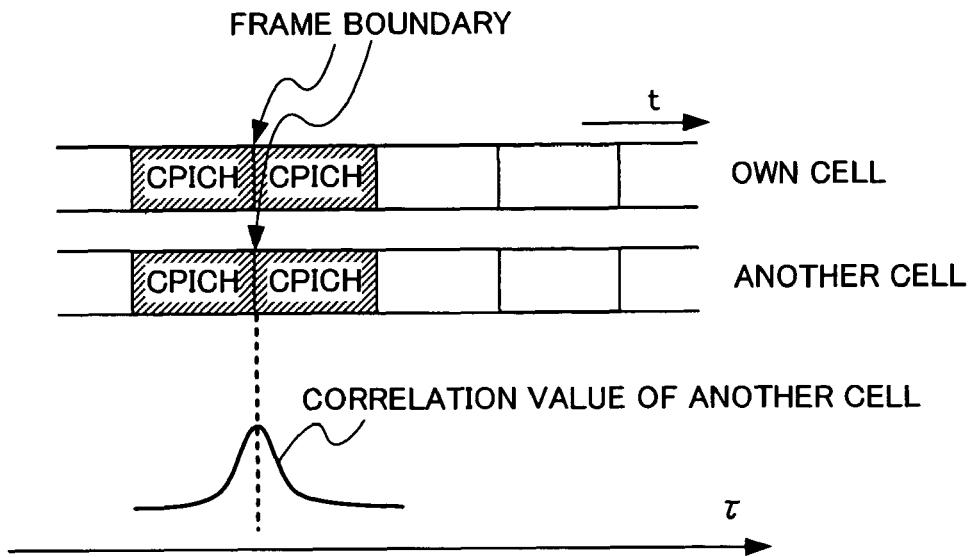
FIG. 6 illustrates cell search processing of the present invention (when the frame timing of another cell and the frame timing of the own cell are the same)
Figure 7:
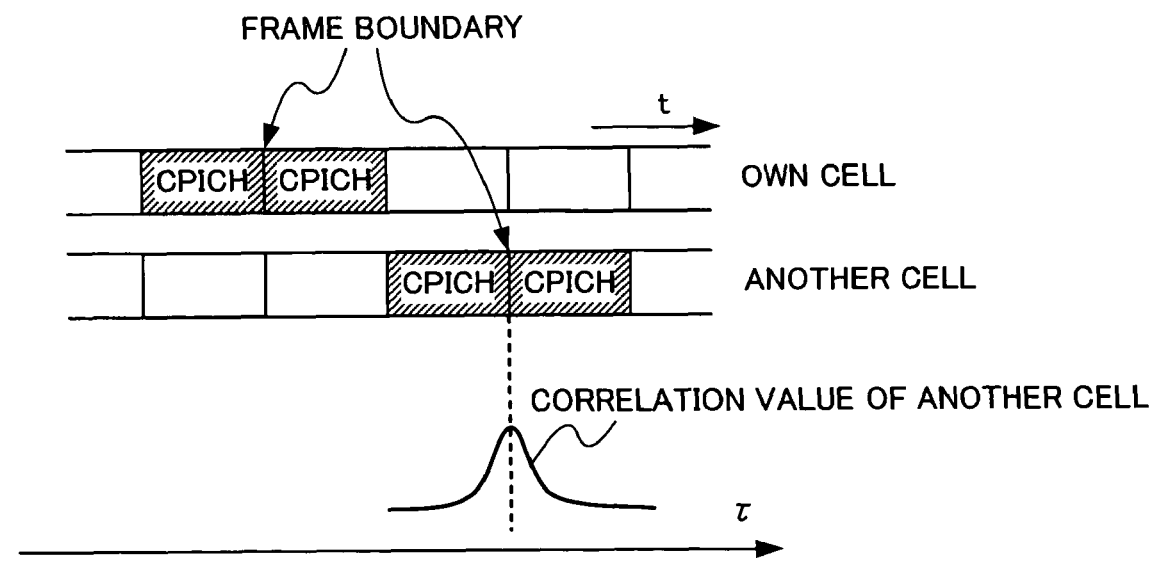
FIG. 7 illustrates cell search processing of the present invention (when the frame timing of another cell and the frame timing of the own cell are different)
Figure 8:
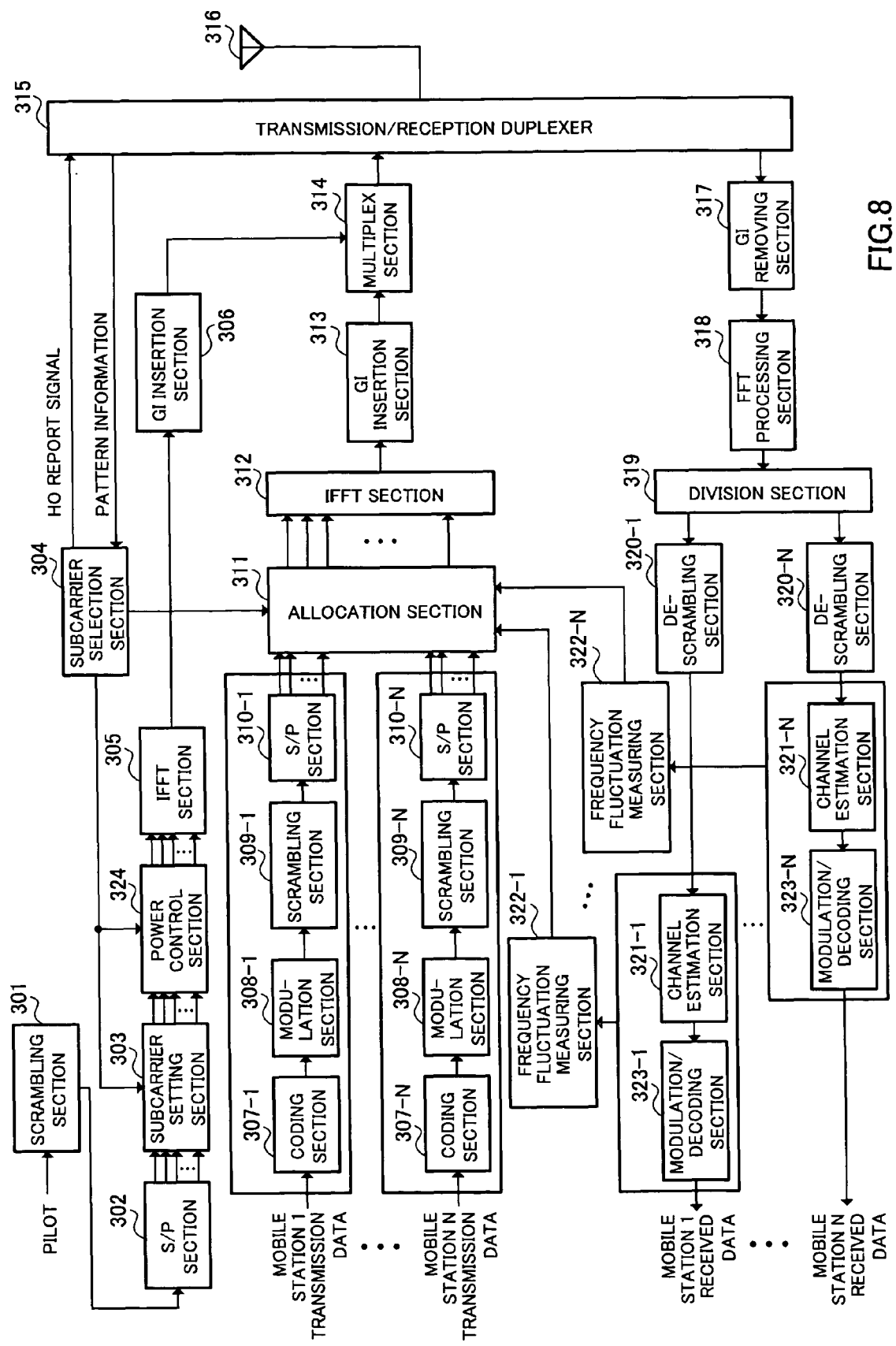
FIG. 8 is a block diagram showing a configuration of a base station apparatus according to one embodiment of the present invention.

FIG. 8 is a block diagram showing a configuration of the base station apparatus according to one embodiment of the present invention. On the transmitting side of the base station apparatus shown in FIG. 8, scrambling section 301 scrambles pilot symbols using a scrambling code specific to the cell, and inputs the result to S/P section 302. S/P section 302 converts the symbols inputted in series from scrambling section 301 to parallel, and inputs the results to subcarrier setting section 303. Every time symbols corresponding to a plurality of subcarriers forming the symbol are inputted in series, S/P section 302 converts these symbols to parallel and allocates the results to the plurality of subcarriers. Subcarrier setting section 303 makes subcarriers selected at subcarrier selection section 304 blank. That is, subcarrier setting section 303 places the subcarriers selected at subcarrier selection section 304 in a transmission-off state to exclude the subcarriers from transmission targets. Hereinafter, subcarriers that are placed in a transmission-off state and become blank will be referred to as blank subcarriers. Part of all subcarriers is set as blank subcarriers by subcarrier setting section 303, and subcarriers other than the blank subcarriers are inputted to power control section 324. Details of subcarrier setting section 303 and subcarrier selection section 304 will be described later.

Power per one symbol becomes smaller by providing blank subcarriers, and therefore deterioration may occur in timing detection accuracy for the case of finding GI correlation in the first step of cell search for another cell. Therefore, as shown in FIG. 9A (before power control) and FIG. 9B (after power control), power control section 324 compensates for the power reduced by blank subcarriers by increasing the power of subcarriers other than the blank subcarriers. That is, power control section 324 distributes the power reduced by blank subcarriers to subcarriers other than the blank subcarriers. By distributing power in this way, the power reduction caused by setting blank subcarriers can be compensated for the power of subcarriers other than the blank subcarriers, and the power per one symbol can be kept constant, so that it is possible to suppress an increase of errors in correlation values due to a decrease in power. Subcarriers including blank subcarriers after power control are subjected to IFFT (Inverse Fast Fourier Transform) at IFFT section 305. Then, guard intervals are inserted to the pilot symbols after IFFT at GI insertion section 306.

On the other hand, data for mobile stations 1 to N are coded at coding sections 307-1 to 307-N. Modulation sections 308-1 to 308-N generate symbols from the coded data, and modulates the data by mapping the generated symbols to one of a plurality of signal points on I-Q plane. Scrambling sections 309-1 to 309-N scramble the modulated symbols.

S/P sections 310-1 to 310-N convert the symbols inputted in series from scrambling section 309 to parallel and input the results to allocation section 311. The signal of each mobile station outputted from S/P sections 310-1 to 310-N is processed at allocation section 311. At this time, allocation section 311 receives position information of blank subcarriers from subcarrier selection section 304 and frequency fluctuation values from frequency fluctuation measuring section 322, and allocates data of the mobile station with little frequency fluctuation (that is, the mobile station with frequency fluctuation less than a predetermined threshold) to subcarriers with the same frequency as blank subcarriers. By this means, it is not necessary to perform channel estimation with high accuracy at blank subcarrier portions, and channel estimation using subcarrier interpolation by the remaining subcarriers other than the blank subcarriers is enough.

The output signal of allocation section 311 is subjected to inverse fast Fourier transform processing at IFFT section 312. Then, guard intervals are inserted to the data symbols after IFFT at GI insertion section 313.

Multiplex section 314 time-multiplexes the GI-inserted pilot symbols with GI-inserted data symbols. The time-multiplexed signal is subjected to predetermined wireless processing such as up-conversion at transmission/reception duplexer 315, and transmitted by radio from antenna 316.

On the receiving side of the base station shown in FIG. 8, the symbols transmitted from the mobile station apparatus are received at antenna 316, subjected to predetermined wireless processing such as down-conversion at transmission/reception duplexer 315, and have the guard intervals removed at GI removing section 317, and subjected to fast Fourier transform processing at FFT processing section 318, and the results are inputted to division section 319.

Figure 10:
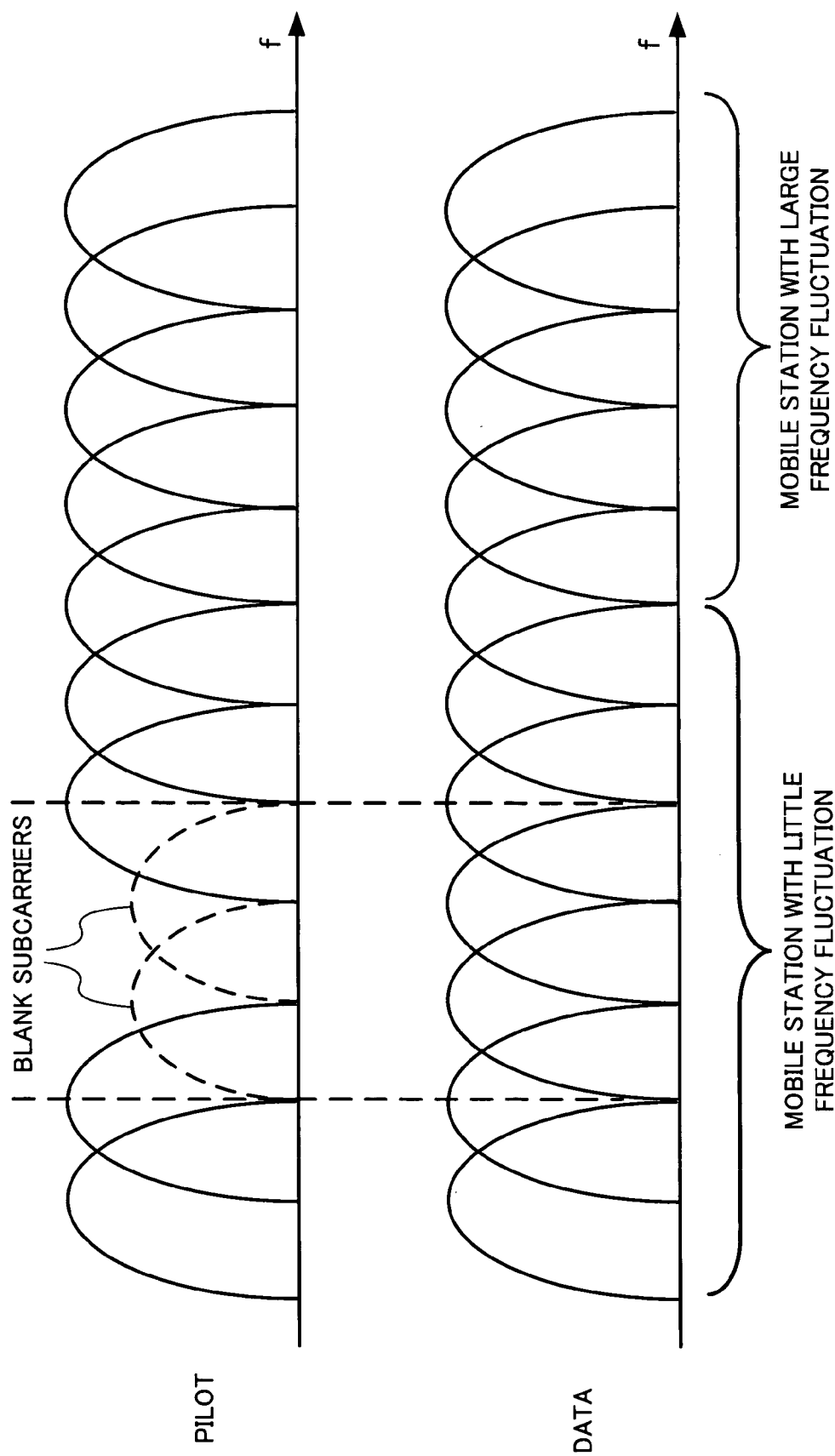
FIG. 10 shows allocation of a transmission data signal according to one embodiment of the present invention.

Division section 319 divides the output signals from FFT processing section 318 for each mobile station, and descrambling sections 320-1 to 320-N descramble data of mobile stations 1 to N. Channel estimation sections 321-1 to 321-N perform channel estimation on the output signals of descrambling sections 320-1 to 320-N using pilot signals. Then, the channel estimation results of mobile stations are inputted from channel estimation sections 321-1 to 321-N to frequency fluctuation measuring sections 322-1 to 322-N. Frequency fluctuation measuring sections 322-1 to 322-N calculate the difference between the channel estimation values for every adjacent subcarriers, and set the average value of the difference values of all subcarriers as a frequency fluctuation value. Then, frequency fluctuation measuring sections 322-1 to 322-N input this frequency fluctuation value to allocation section 311. As shown in FIG. 10, allocation section 311 allocates data of the mobile station with little frequency fluctuation (that is, the mobile station with frequency fluctuation less than the threshold) to the subcarriers with the same frequency as blank subcarriers based on the inputted frequency fluctuation value. By performing allocation in this way, frequency fluctuation can be reduced at blank subcarrier portions, so that it is possible to improve the accuracy of channel estimation.

The channel estimation results obtained at channel estimation sections 321-1 to 321-N are inputted to demodulation/decoding sections 323-1 to 323-N. Demodulation/decoding sections 323-1 to 323-N obtain data of mobile stations using the inputted channel estimation results. By this means, received data of each of mobile stations 1 to N can be obtained.

Figure 11:
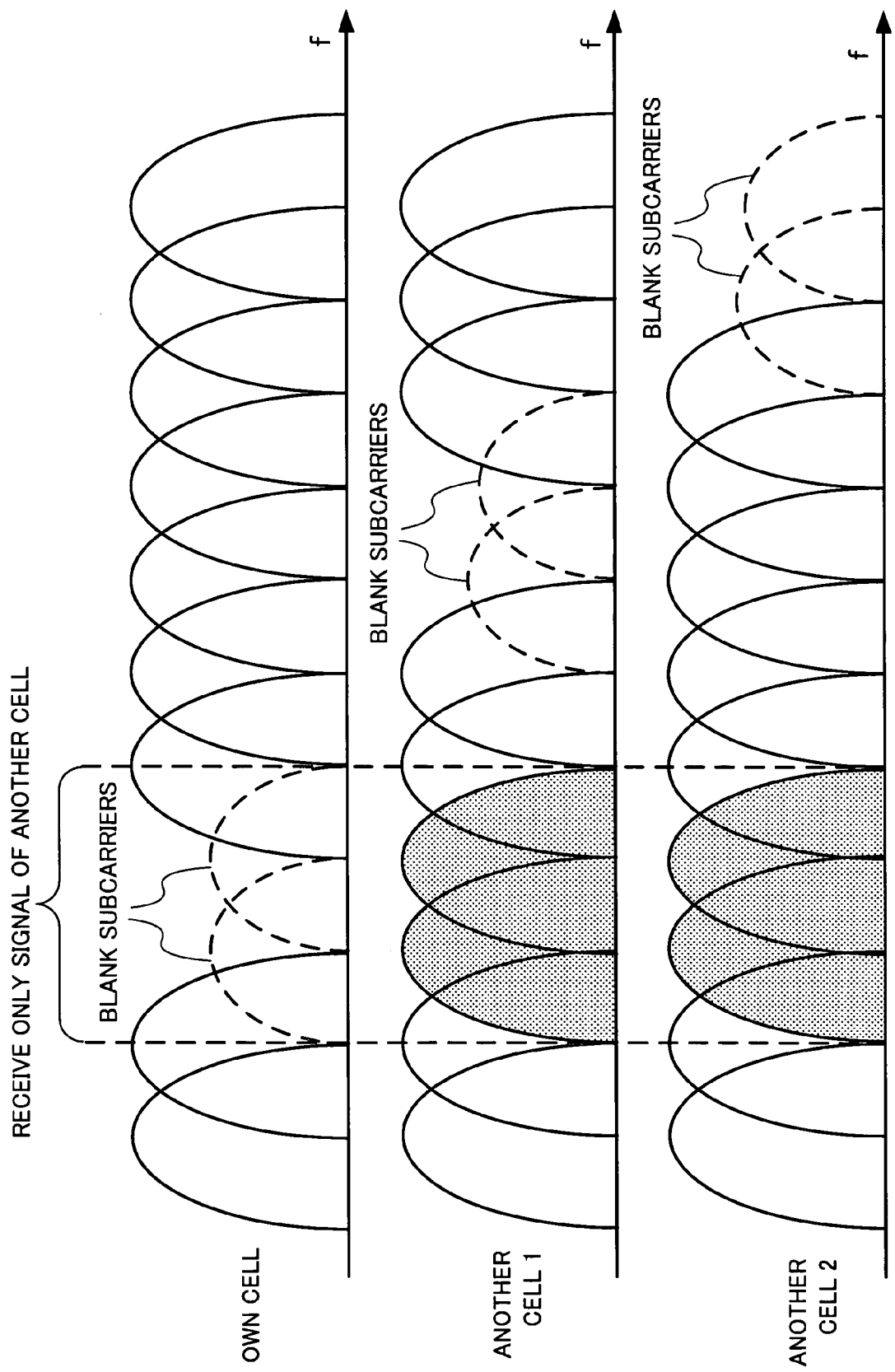
FIG. 11 shows a subcarrier configuration of a transmission pilot signal according to one embodiment of the present invention.

Next, subcarrier setting section 303 and subcarrier selection section 304 will be described in detail. When the start of a handover of a mobile station is detected by a report signal (HO report signal) transmitted from the mobile station and indicating the start of a handover, subcarrier selection section 304 selects blank subcarriers among all the subcarriers of the pilot symbol so as to enable the mobile station to receive only a signal of another cell for cell search for another cell and perform cell search. Subcarrier setting section 303 sets the subcarriers selected at subcarrier selection section 304 as blank subcarriers to place the subcarriers in a transmission-off state. Subcarrier setting section 303 and subcarrier selection section 304 operate only when the start of a handover of a mobile station is detected, so as to reduce power consumption. Further, the blank subcarriers are selected in a random manner for each base station in order to prevent the positions of blank subcarriers from overlapping between base stations, since the frame timing of only another cell cannot be accurately detected when the blank subcarrier position of the own cell is overlapped with the blank subcarrier position of another cell. FIG. 11 shows a configuration of the subcarriers of the pilot symbol of the own cell, another cell 1 and another cell 2. As shown in FIG. 11, blank subcarriers are selected so that the blank subcarriers of the own cell and the blank subcarriers of another cell do not have the same frequency. By setting subcarriers with different frequencies between cells as blank subcarriers in this way, the mobile station can detect all the signals of another cell that can be received, so that it is possible to perform cell search for another cell with high accuracy. Further, at each cell, blank subcarriers are not consecutively selected on the frequency axis, but blank subcarriers are selected at intervals on the frequency axis. By selecting blank subcarriers at intervals in this way, the blank subcarriers can be set evenly over all subcarriers, so that it is possible to improve the accuracy of subcarrier interpolation for channel estimation. Pattern information indicating the patterns of blank subcarriers selected at subcarrier selection section 304 is transmitted to the mobile station apparatus from antenna 316 through transmission/reception duplexer 315 as broadcast information.

Figure 12:
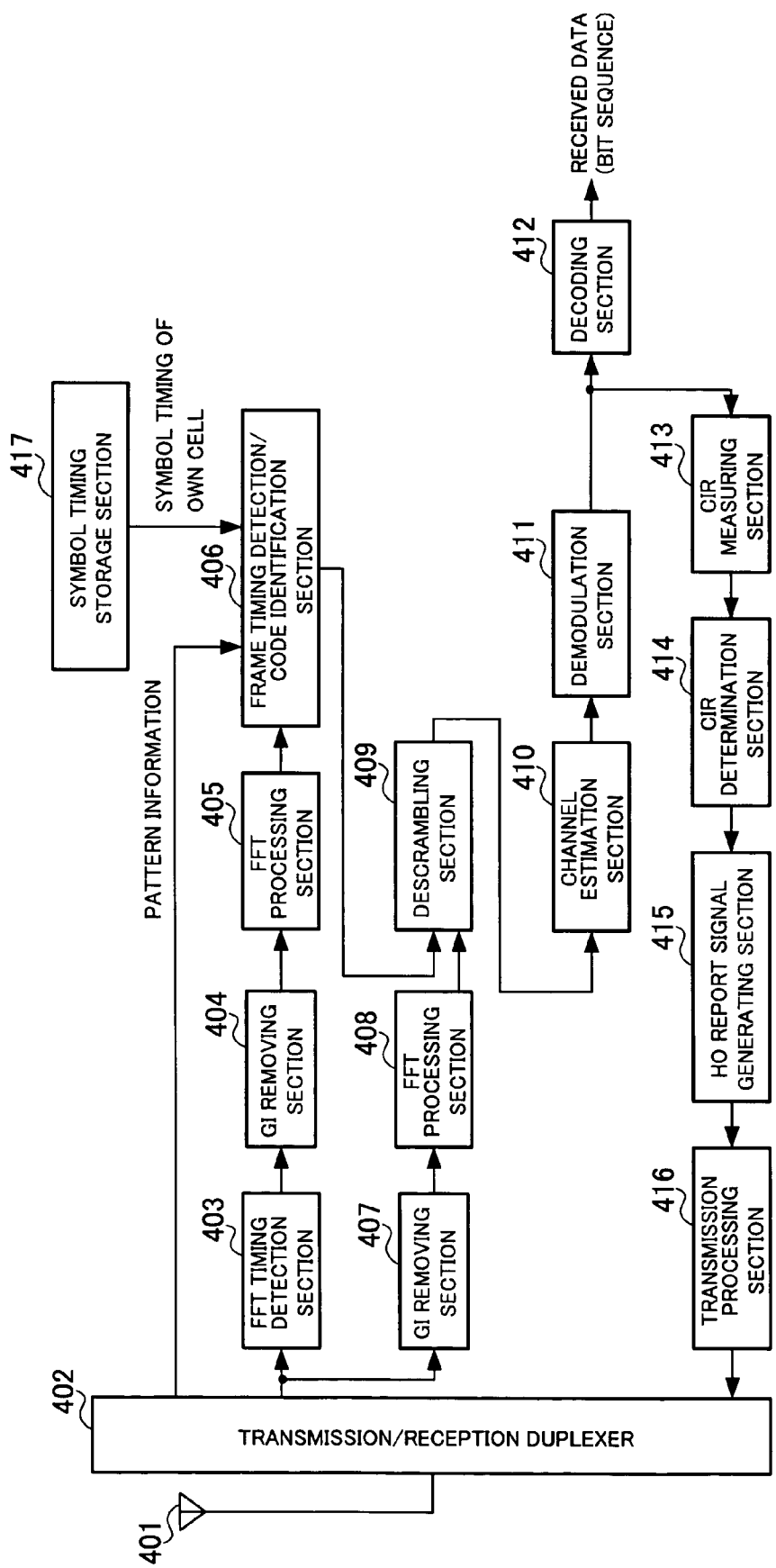
FIG. 12 is a block diagram showing a configuration of a mobile station apparatus according to one embodiment of the present invention.

Next, the configuration of the mobile station apparatus receiving the signal transmitted from the base station apparatus shown in FIG. 8 will be described. FIG. 12 is a block diagram showing a configuration of the mobile station apparatus according to one embodiment of the present invention.

In the mobile station apparatus shown in FIG. 12, the signal transmitted from the base station apparatus shown in FIG. 8 is received at antenna 401, and subjected to predetermined wireless processing such as down-conversion at transmission/reception duplexer 402, and the result is inputted to FFT timing detection section 403. Upon cell search for another cell, FFT timing detection that is first step processing of the cell search is performed at FFT timing detection section 403. As described above, the FFT timing can be obtained using GI correlation characteristics. The signal after symbol timing detection is inputted to GI removing section 404. GI removing section 404 removes the GIs of the inputted signal based on the symbol timing detected at FFT timing detection section 403. Then, at FFT processing section 405, fast Fourier transform processing (FFT processing) is performed on the signal after GI removing.

The output signal of FFT processing section 405 is inputted to frame timing detection/code identification section 406, and frame timing detection that is the second step processing in the cell search and scrambling code identification processing that is the third step processing in the cell search are performed. The symbol timing of the own cell used at this time is information known by the mobile station through cell search, and can be obtained from symbol timing storage section 417. Further, pattern information of the blank subcarriers of the base station in the own cell is received at antenna 401. Details of frame timing detection and scrambling code identification processing will be described later.

After cell search for another cell, GI removing section 407 removes guard intervals from the received signal, and FFT processing section 408 performs fast Fourier transform processing. The obtained data is descrambled at descrambling section 409 using the scrambling code identified by frame timing detection/code identification section 406. Channel estimation section 410 performs channel estimation using the pilot signal in the output signal of descrambling section 409. Blank subcarriers are set in CPICH, which is a pilot, and therefore the accuracy of channel estimation with the blank subcarriers deteriorates. Therefore, channel estimation section 410 interpolates a channel estimation value of the blank subcarriers using the channel estimation value of the subcarriers other than the blank subcarriers, thereby preventing deterioration of channel estimation. Demodulation and decoding processing are performed on the output signal of channel estimation section 410 at demodulation section 411 and decoding section 412 respectively. As a result, received data can be obtained.

Further, CIR measuring section 413 measures the CIR using the pilot signal of the output signal of demodulation section 411, and outputs the measurement result to CIR determination section 414. CIR determination section 414 determines whether the CIR measured at CIR measuring section 413 is larger or smaller than a predetermined threshold, and outputs the determination result to HO (handover) report signal generating section 415. The CIR measurement accuracy improves by averaging CIRs over a plurality of symbols.

When the CIR measured at CIR measuring section 413 is less than a predetermined threshold, HO report signal generating section 415 generates a HO report signal for reporting the start of a handover to the base station, and inputs the signal to transmission processing section 416. The HO report signal is modulated at transmission processing section 416 and transmitted from antenna 401 via transmission/reception duplexer 402.

Figure 13:
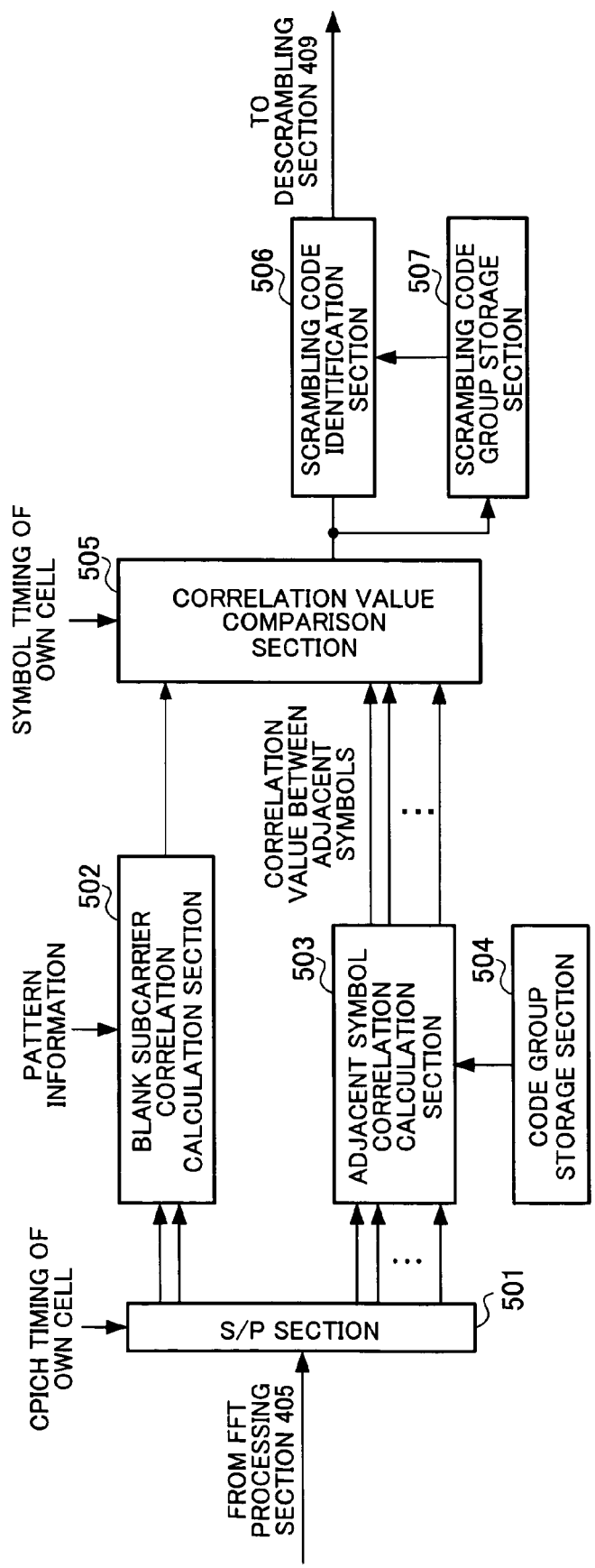
FIG. 13 is a block diagram showing a configuration of a frame timing detection/code identification section of the mobile station apparatus according to one embodiment of the present invention.

Next, the configuration of frame timing detection/code identification section 406 shown in FIG. 12 will be described. FIG. 13 is a block diagram showing the configuration of frame timing detection/code identification section of the mobile station apparatus according to one embodiment of the present invention.

In FIG. 13, the output symbols from FFT processing section 405 are converted from a series signal to a parallel signal for each symbol at S/P section 501. S/P section 501 outputs the parallel signal to adjacent symbol correlation calculation section 503. Further, when the timing of inputted CPICH (pilot signal) of the own cell and the symbol timing of the parallel signal are the same, S/P section 501 outputs the timing to blank subcarrier correlation calculation section 502. Blank subcarrier correlation calculation section 502 determines whether or not there is a signal of another cell having the same timing as the frame timing of the own cell.

Figure 14:
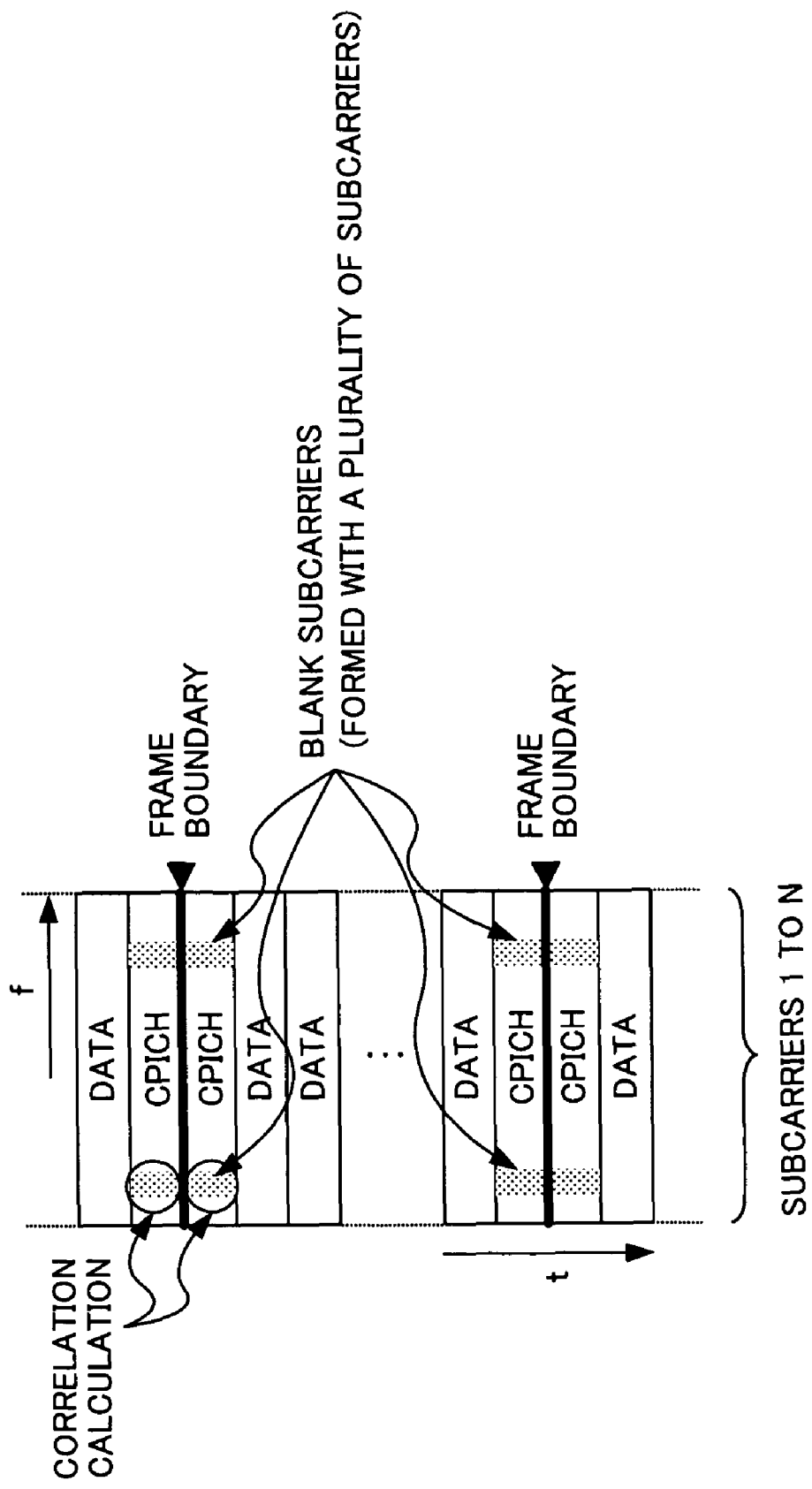
FIG. 14 shows a frame format according to one embodiment of the present invention.

Blank subcarrier correlation calculation section 502 receives pattern information of the blank subcarriers from the base station in the own cell, and, as shown in FIG. 14, performs correlation calculation between the blank subcarriers of adjacent CPICH symbols of the signal of the own cell, and outputs the correlation values to correlation value comparison section 505.

Adjacent symbol correlation calculation section 503 performs correlation calculation between adjacent symbols in the frequency axis direction. Here, code group sequences outputted from code group storage section 504 are inputted to adjacent symbol correlation calculation section 503. Correlation calculation at adjacent symbol correlation calculation section 503 is performed using a code group candidate and two adjacent symbols. This correlation calculation is performed for all code group sequences, and the code group sequence with the largest correlation value is set as a code group candidate between adjacent symbols. The correlation values that are calculation results, code group candidate, and symbol data are outputted to correlation value comparison section 505.

Correlation value comparison section 505 compares the correlation values inputted from adjacent symbol correlation calculation section 503, and detects the boundary of the adjacent symbols having the largest correlation value as a frame timing of another cell. Furthermore, correlation value comparison section 505 identifies the code group. At this time, when the selected frame timing of another cell and the frame timing of the own cell are the same, correlation value comparison section 505 detects the frame timing of another cell using the correlation value at blank subcarriers in CPICH of the own cell. That is, when the correlation value in blank subcarrier correlation calculation section 502 is less than a predetermined threshold, correlation value comparison section 505 determines that there is no frame timing of another cell that is the same as the frame timing of the own cell, and detects the frame timing with the largest correlation value other than the frame timing of the own cell as a frame timing of another cell. On the other hand, when the correlation value is equal to or larger than the threshold, correlation value comparison section 505 determines that the frame timing of another cell and the frame timing of the own cell are the same, and detects the frame timing of the own cell as a frame timing of another cell. By performing such determination, it is possible to prevent detecting in error the frame timing of the own cell as a frame timing of another cell.

Scrambling code identification section 506 identifies CPICH of another cell at the frame timing of another cell detected at correlation value comparison section 505, and obtains scrambling code candidates belonging to the code group identified at correlation value comparison section 505 from scrambling code group storage section 507. Scrambling code identification section 506 generates a replica of CPICH for all scrambling code candidates and calculates the correlation value between the replica and a received signal. Scrambling code identification section 506 determines the scrambling code providing the largest correlation value as a desired scrambling code.

Next, the operation of the mobile station apparatus according to this embodiment will be described using FIG. 15.

Figure 15:
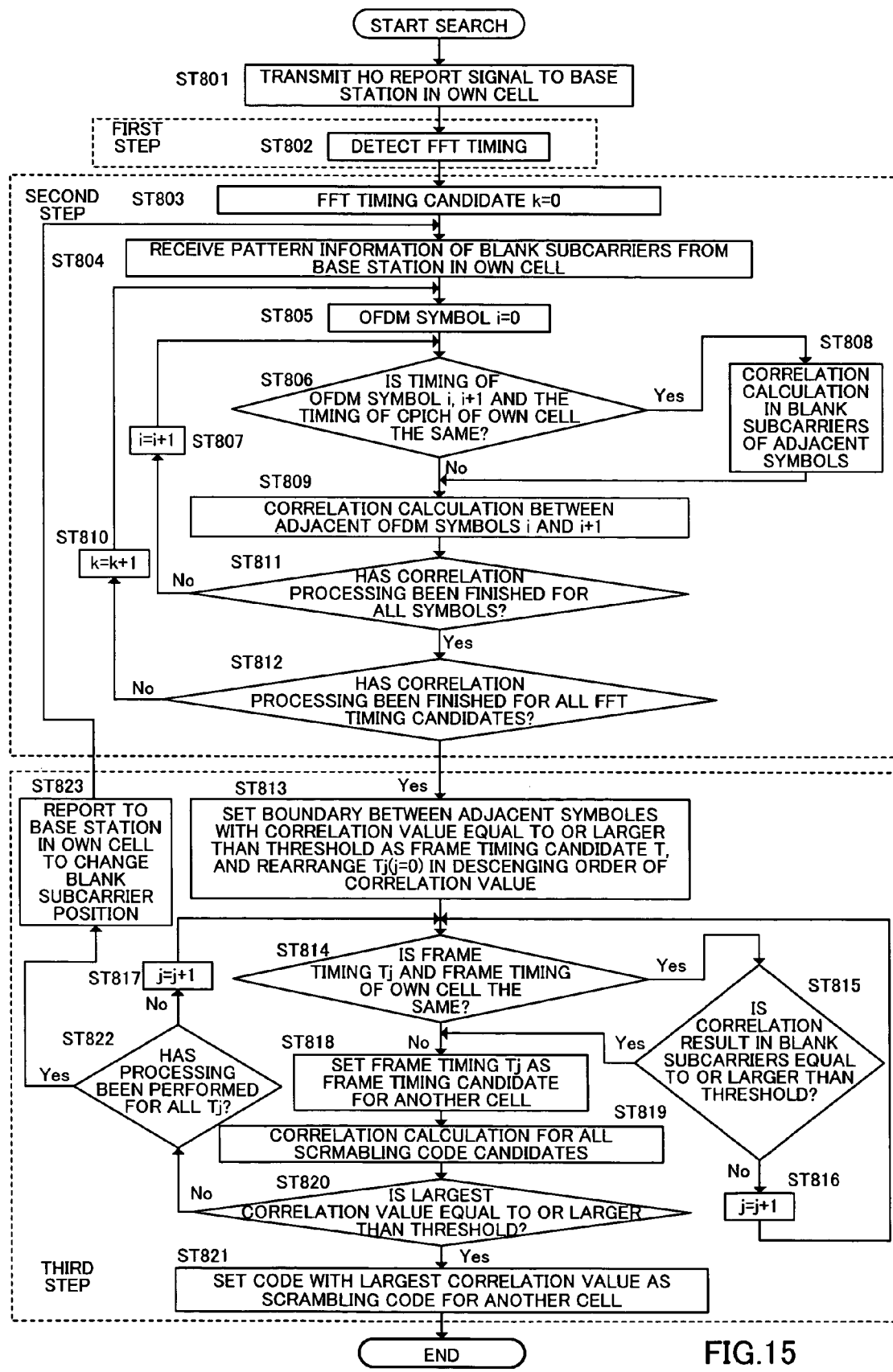
FIG. 15 is a flowchart showing operation of the mobile station apparatus according to one embodiment of the present invention.

In FIG. 15, in ST801, the mobile station transmits a HO report signal to the base station in the own cell upon the start of a handover. At the base station in the own cell receiving this HO report signal, subcarrier selection section 304 in FIG. 8 selects blank subcarriers using a specific pattern for cell search for another cell.

In ST802, in a first step of cell search, FFT timing detection section 403 in FIG. 12 detects the FFT timing of the received signal to detect the symbol timing.

In ST803, processing after ST804 is performed, from k=0 based on the FFT timing candidates detected in the first step.

In ST804, the mobile station receives pattern information of blank subcarriers transmitted by the base station in the own cell. The pattern information of blank subcarriers is inputted to blank subcarrier correlation calculation section 502 in FIG. 13. Then, based on the symbol timing obtained in ST802, processing of ST806 to ST809 and ST811 is performed for every adjacent symbols (ST805).

In ST806, S/P section 501 in FIG. 13 determines whether or not the symbol timing of the adjacent symbols and the symbol timing of CPICH of the own cell are the same. If the symbol timing of adjacent symbols and the symbol timing of the CPICH of the own cell are the same, the flow proceeds to ST808. On the other hand, if the symbol timing of the adjacent symbols and the symbol timing of the CPICH of the own cell are not the same, the flow proceeds to ST809.

Figure 16:
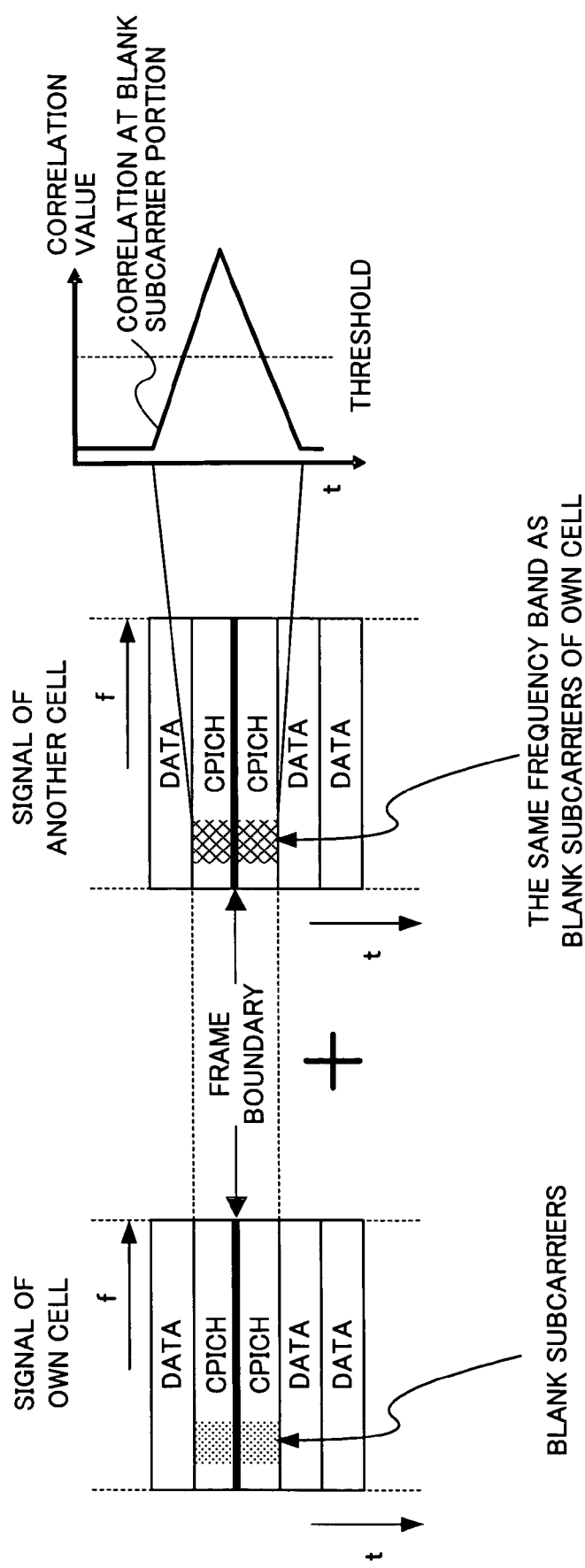
FIG. 16 shows a relationship between frame timings and blank subcarriers according to one embodiment of the present invention (when the frame timing of the own cell and the frame timing of another cell are the same)
Figure 17:
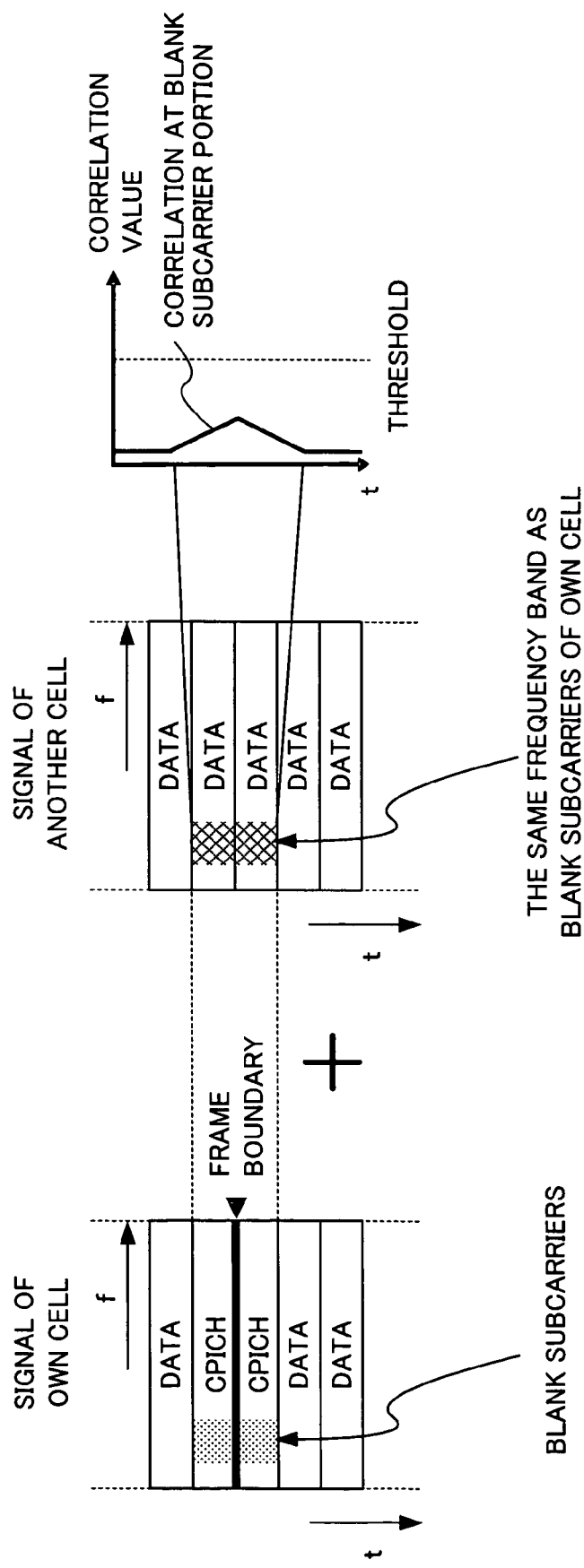
FIG. 17 shows a relationship between frame timings and blank subcarriers according to one embodiment of the present invention (when the frame timing of the own cell and the frame timing of another cell are different).

In ST808, the symbol timing of adjacent symbols and the symbol timing of CPICH of the own cell are the same, and therefore the blank subcarriers in the CPICH symbol of the own cell are included in the adjacent symbols. Only the signal of another cell exists at the blank subcarrier position, and therefore, by performing correlation calculation between adjacent symbols at the blank subcarrier position in blank subcarrier correlation calculation section 502 in FIG. 13, it is possible to know whether or not the frame timing of another cell and the frame timing of the own cell are the same. FIG. 16 and FIG. 17 show the relationship between frame timings (frame boundaries) and blank subcarriers. FIG. 16 shows a case where the frame timing of the own cell and the frame timing of another cell are the same, and FIG. 17 shows a case where the frame timing of the own cell and the frame timing of another cell are different. As shown in FIG. 16, when the correlation value is equal to or larger than a predetermined threshold, it is possible to determine that the frame timing of the own cell and the frame timing of another cell are the same. On the other hand, as shown in FIG. 17, when the correlation value is less than the threshold, it is possible to determine that the frame timing of the own cell and the frame timing of another cell are different. By performing correlation calculation between the blank subcarriers of the adjacent CPICH symbols of the own cell in this way, it is possible to detect the frame timing using only the signal of another cell.

In ST809, adjacent symbol correlation calculation section 503 in FIG. 13 performs correlation calculation between all adjacent symbols in the frequency axis direction.

In ST811, it is confirmed whether or not correlation calculation is performed for all symbols. When correlation calculation is finished for all symbols, the flow proceeds to ST812. If correlation calculation has not been finished for all symbols, the flow proceeds to ST807, i=i+1 is set, and correlation calculation in ST806 is performed for the next symbols.

In ST812, it is confirmed whether or not correlation processing has been finished for all FFT timing candidates. When correlation processing has been finished for all FFT timing candidates, the flow proceeds to ST813. On the other hand, when correlation processing has not been finished for all FFT timing candidates, the flow proceeds to ST810, setting k=k+1, the flow returns to ST805, and correlation calculation between adjacent symbols is performed again for the next FFT timing candidates.

In ST813, correlation value comparison section 505 in FIG. 13 compares between the correlation value obtained for all FFT timing candidates in ST809 and the threshold, and, when the correlation value is equal to or larger than the threshold, the boundary between the adjacent symbols with that correlation value is made frame timing candidate T. Frame timing candidates are selected in a descending order of the correlation value, and processed in ST814.

In ST814, it is determined whether or not frame timing candidate T and the frame timing of the own cell are the same. If frame timing candidate T and the frame timing of the own cell are the same, the flow proceeds to ST815. If frame timing candidate T and the frame timing of the own cell are not the same, the flow proceeds to ST818.

In ST815, frame timing candidate T and the frame timing of the own cell are the same, and therefore, by performing correlation calculation between adjacent symbols in the frequency axis direction at the blank subcarriers in CPICH of the signal of the own cell, it is confirmed whether or not the frame timing of another cell and the frame timing of the own cell are the same. When the correlation value obtained at the blank subcarriers is equal to or larger than the predetermined threshold, it is considered that the frame timing of another cell exists at the frame timing positions of the own cell, and therefore the flow proceeds to ST818, and frame timing candidate $T_j$ is made a frame timing candidate for another cell. On the other hand, when the correlation value at the blank subcarrier position is less than the threshold, the flow proceeds to ST816, setting j=j+1, and processing of ST814 is performed for the next frame timing candidate $T_{j+1}$.

In ST819, scrambling code identification section 506 in FIG. 13 performs correlation calculation for all scrambling code candidates, determines whether or not the correlation value is equal to or larger than a predetermined threshold in ST820, and, when the correlation value is less than the threshold, determines whether or not the processing has been performed for all frame timing candidates $T_j$ in ST822. If processing has not been finished, the flow proceeds to ST817, setting j=j+1, and, returning back to ST814, scrambling code identification processing is performed for next frame timing candidate $T_{j+1}$. If processing has been finished, it is determined that the blank subcarrier position of the own cell overlaps with the blank subcarrier position of another cell, the base station in the own cell is reported so as to change the blank subcarrier position in ST823, and, returning back to ST804, the frame timing detection of the second step is performed. When the correlation value is equal to or larger than the threshold in ST820, it is determined that the detected frame timing candidates and scrambling code are ones for desired another cell, and cell search for another cell is finished.

As described above, according to this embodiment, cell search can be accurately performed using only signal of another cell, so that it is possible to prevent detecting in error the frame timing for another cell.

Further, according to this embodiment, blank subcarriers for cell search for another cell are provided in the pilot signal of the own cell, so that it is possible to reduce frame timing detection processing in the second step of the cell search.

The base station apparatus according to the above-described embodiment may be referred to as "Node B", the mobile station apparatus as "UE", and the subcarrier as "tone."

Further, each function block used to explain the above-described embodiment is typically implemented as an LSI constituted by an integrated circuit. These may be individual chips or may partially or totally contained on a single chip.

Furthermore, here, each function block is described as an LSI, but this may also be referred to as "IC", "system LSI.", "super LSI", "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor in which connections and settings of circuit cells within an LSI can be reconfigured is also possible.

Further, if integrated circuit technology comes out to replace LSI's as a result of the development of semiconductor technology or a derivative other technology, it is naturally also possible to carry out function block integration using this technology. Application in biotechnology is also possible.

The present application is based on Japanese Patent Application No. 2004-210661, filed on Jul. 16, 2004, the entire content of which is expressly incorporated by reference herein.

INDUSTRIAL APPLICABILITY

The present invention is suitable for a wireless mobile station apparatus, wireless communication base station apparatus and the like used in a mobile communication system.

The invention claimed is:

1. A mobile station apparatus comprising:
a reception section that receives a known signal, which is formed with a plurality of subcarriers and in which part of the plurality of subcarriers is set as a blank subcarrier that is placed in a transmission-off state and becomes blank, from a base station of an own cell in which the mobile station apparatus is located, and from a base station of another cell; and
a cell search section that performs cell search for the other cell using the known signal received from the base station of the other cell in a blank subcarrier portion of the known signal received from the base station of the own cell,
wherein the cell search section:
detects fast Fourier transform timing candidates;
at the fast Fourier transform timings, finds a plurality of correlation values by performing correlation calculation between a plurality of known signals received from the base station of the other cell in the blank subcarrier portion;
makes frame timings corresponding to the correlation values equal to or above a threshold, from among the plurality of correlation values, as frame timing candidates;
makes frame timings that are not frame timings for the own cell, from among the frame timing candidates, as frame timings for the other cell; and
identifies a scrambling code providing a maximum correlation value, from among the frame timings for the other cell, as a scrambling code for the other cell.

2. The mobile station apparatus according to claim 1, further comprising an estimation section that interpolates a channel estimation value of the blank subcarrier using a channel estimation value of a subcarrier other than the blank subcarrier to perform channel estimation.

3. The mobile station apparatus according to claim 1, wherein said cell search section confirms whether there is a frame timing for the other cell at the blank subcarrier portion to perform the cell search.

4. A base station apparatus comprising:
a setting section that performs a setting operation of setting each one of fewer than all of a plurality of subcarriers forming a known signal as a blank subcarrier that is placed in a transmission-off state and becomes blank;
a transmission section that transmits the known signal including each blank subcarrier to a mobile station; and
an allocation section that allocates data for the mobile station with less frequency fluctuation than a threshold to a subcarrier of the same frequency as each blank subcarrier among a plurality of subcarriers forming a data symbol.

5. The base station apparatus according to claim 4, further comprising a power control section that distributes power reduced by setting each blank subcarrier, to a subcarrier other than the blank subcarrier.

6. The base station apparatus according to claim 4, wherein the setting section performs the setting operation when a start of a handover of the mobile station is detected.

7. The base station apparatus according to claim 4, wherein said setting section sets a subcarrier with a different frequency from a blank subcarrier set by another base station, as a blank subcarrier.

8. The base station apparatus according to claim 4, wherein said setting section sets blank subcarriers evenly over the plurality of subcarriers.

9. A cell search method at a mobile station, comprising:
a reception step of receiving a known signal, which is formed with a plurality of subcarriers and in which part of the plurality of subcarriers is set as a blank subcarrier that is placed in a transmission-off state and becomes blank, from a base station of an own cell in which the mobile station is located, and from a base station of another cell; and
a cell search step of performing cell search for the other cell using the known signal received from the base station of the other cell in a blank subcarrier portion of the known signal received from the base station of the own cell,
wherein the cell search step comprises:
detecting fast Fourier transform timing candidates;
at the fast Fourier transform timings, finding a plurality of correlation values by performing correlation calculation between a plurality of known signals received from the base station of the other cell in the blank subcarrier portion;
making frame timings corresponding to the correlation values equal to or above a threshold, from among the plurality of correlation values, as frame timing candidates;
making frame timings that are not frame timings for the own cell, from among the frame timing candidates, as frame timings for the other cell; and
identifying a scrambling code providing a maximum correlation value, from among the frame timings for the other cell, as a scrambling code for the other cell.

10. The cell search method according to claim 9, wherein said blank subcarrier is set when a start of a handover of the mobile station is detected by the base station in the own cell.

11. A data allocation method at a base station, the method comprising:
a setting step of performing a setting operation of setting each one of fewer than all of a plurality of subcarriers forming a known signal as a blank subcarrier that is placed in a transmission-off state and becomes blank;
a transmission step of transmitting the known signal including each blank subcarrier to a mobile station; and
an allocation step of allocating data for the mobile station with less frequency fluctuation than a threshold to a subcarrier of the same frequency as each blank subcarrier among a plurality of subcarriers forming a data symbol.

* * * * *